United States Patent
Yamashita

(10) Patent No.: US 6,622,969 B2
(45) Date of Patent: Sep. 23, 2003

(54) MANEUVER DEVICE FOR ARTIFICIAL SATELLITE

(75) Inventor: Toshiaki Yamashita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/078,109

(22) Filed: Feb. 20, 2002

(65) Prior Publication Data

US 2002/0148930 A1 Oct. 17, 2002

(30) Foreign Application Priority Data

Mar. 1, 2001 (JP) .......................... 2001-056617

(51) Int. Cl.$^7$ ............................... B64G 1/28
(52) U.S. Cl. ...................... 244/165; 701/13; 244/169
(58) Field of Search .............................. 244/164, 165, 244/169, 171; 701/13

(56) References Cited

U.S. PATENT DOCUMENTS

| | | | | |
|---|---|---|---|---|
| 5,259,577 A | * | 11/1993 | Achkar et al. .............. | 244/164 |
| 5,540,405 A | * | 7/1996 | Bender et al. .............. | 244/166 |
| 5,850,992 A | * | 12/1998 | Flament et al. ............. | 244/168 |
| 6,019,320 A | * | 2/2000 | Shah et al. ................. | 244/171 |
| 6,032,903 A | * | 3/2000 | Fowell et al. ............... | 244/165 |
| 6,216,983 B1 | * | 4/2001 | Wehner et al. ........... | 244/158 R |
| 6,347,262 B1 | * | 2/2002 | Smay et al. ................ | 244/164 |

FOREIGN PATENT DOCUMENTS

| | | |
|---|---|---|
| JP | 04-189699 | 7/1992 |
| JP | 7-33095 | 2/1995 |
| JP | 07-033095 | 2/1995 |
| JP | 2754910 | 3/1998 |
| JP | 10-244997 | 9/1998 |
| JP | 11-227698 | 8/1999 |
| JP | 2000-280996 | 10/2000 |

* cited by examiner

*Primary Examiner*—Galen L. Barefoot
(74) *Attorney, Agent, or Firm*—Whitham, Curtis & Christofferson, PC

(57) ABSTRACT

The present invention provides a maneuver device for an artificial satellite, which causes small attitude error during maneuver and which requires a shorter period of setting time for obtaining a target attitude.

The maneuver device is provided with: a feed forward torque instruction signal generator 8 which outputs a feed forward torque instruction signal 11 based on a maneuver plan; a thruster 10 which outputs control torque based on the feed forward torque instruction signal 11; and an attitude control signal calculator 6 to which an attitude angle and an angular velocity of the artificial satellite as well as a target attitude angle and a target angular velocity are input and which outputs an attitude control signal 13. The maneuver device is further provided with a disturbance compensating signal calculator to which the feed forward torque instruction signal 11 and a detected angular velocity signal 16 are input, and which generates and outputs a disturbance compensating signal 12. The maneuver device is yet further provided with a reaction wheel 7 which generates control torque based on the attitude control signal 13 and the disturbance compensating signal 12.

20 Claims, 9 Drawing Sheets

MANEUVER DEVICE FOR ARTIFICIAL SATELLITE

FIELD OF THE INVENTION

The present invention relates to a maneuver device for an artificial satellite, which can greatly and speedily change an attitude angle and an angular velocity of the artificial satellite by means of an attitude control actuator such as a thruster and a reaction wheel mounted on the artificial satellite.

BACKGROUND OF THE INVENTION

Artificial satellites are conventionally provided with a maneuver device which controls the attitude of the artificial satellite. FIG. 9 is a block diagram showing a configuration of an exemplary conventional maneuver device.

In the FIG. 9, the conventional maneuver device is provided with a feed forward torque instruction signal generator 107 for outputting a feed forward torque instruction signal 110 according to a pre-programmed maneuver plan, and a thruster 108 for generating control torque based on the input feed forward torque instruction signal 110 and applying the generated control torque to satellite dynamics 100. The satellite dynamics 100 represent the dynamic behavior of the artificial satellite incorporating this maneuver device. The maneuver device is further provided with an attitude angle detector 101 for detecting an attitude angle of the satellite dynamics 100 and outputting it as a detected attitude angle signal, an angular velocity detector 102 for detecting an angular velocity of the satellite dynamics 100 and outputting it as a detected angular velocity signal, a target attitude angle value generator 103 for generating a target value of the attitude angle of the satellite dynamics 100 and outputting it as a target attitude angle signal, and a target angular velocity value-generator 104 for generating a target value of the angular velocity of the satellite dynamics 100 and outputting it as a target angular velocity signal. The device is yet further provided with an attitude control signal calculator 105 for outputting an attitude control signal 111 based on inputs of an attitude angle error signal 112 (a difference signal between the target attitude angle signal and the detected attitude angle signal) and an angular velocity error signal 113 (a difference signal between the target angular velocity signal and the detected angular velocity signal), and a reaction wheel 106 for generating control torque based on the input attitude control signal 111.

Next, operations performed by this conventional maneuver device will be described. First, the feed forward torque instruction signal generator 107 generates a feed forward torque instruction signal 110 as torque to be applied to each axis of the satellite dynamics 100 at each time point according to the maneuver plan, and outputs the feed forward torque instruction signal 110 to the thruster 108. The thruster 108 is driven based on the input feed forward torque instruction signal 110 to generate and apply control torque to the satellite dynamics 100.

The feed forward torque instruction signal generator 107 outputs the feed forward torque instruction signal 110 according to the pre-calculated maneuver plan regardless of the state of the satellite dynamics 100. Thus, the accuracy of controlling the attitude may strikingly be deteriorated due to, for example, disturbance torque applied from the external environment to the satellite dynamics 100, an error of the feed forward torque instruction signal 110, an output error of the reaction wheel 106 and a control error caused by discrete outputs generated by the thruster 108.

The disturbance torque applied to the satellite dynamics 100 includes solar radiation pressure torque caused by pressure of sunlight, gravity gradient torque caused by gravity of the earth and the like, torque caused by control gas jet injected from the thruster striking against the artificial satellite (i.e., torque caused by a plume of the thruster), residual magnetic torque caused by interaction between the magnetism of the artificial satellite and the geomagnetic field, and aerodynamic torque caused by impact of a slight amount of aeromolecules existing in the orbit of the artificial satellite.

In order to compensate for attitude errors caused by such disturbance torque and control errors, the conventional maneuver device employs a system including the attitude angle detector 101, the angular velocity detector 102, the target attitude angle value generator 103, the target angular velocity value generator 104, the attitude control signal calculator 105, and the reaction wheel 106 which compensates for the attitude error during maneuver.

During the maneuver carried out by the feed forward torque instruction signal generator 107 and the thruster 108, the target attitude angle value generator 103 generates and outputs a target value of the attitude angle of the artificial satellite to the attitude control signal calculator 105 at each time point. At the same time, the target angular velocity value generator 104 generates and outputs a target value of the angular velocity of the artificial satellite to the attitude control signal calculator 105 at each time point. The attitude angle detector 101 detects the actual attitude angle of the artificial satellite and outputs it as a detected attitude angle signal to the attitude control signal calculator 105. At the same time, the angular velocity detector 102 detects the actual angular velocity of the artificial satellite and outputs it as a detected angular velocity signal to the attitude control signal calculator 105. Then, the attitude control signal calculator 105 generates an attitude control signal 111 based on an attitude angle error signal 112 generated as a difference signal between the target attitude angle signal and the detected attitude angle signal as well as an angular velocity error signal 113 generated as a difference signal between the target angular velocity signal and the detected angular velocity signal, and outputs the generated signal 111 to the reaction wheel 106. Here, the attitude control signal calculator 105 generates the attitude control signal 111 only with the input of the attitude angle error signal 112 and the angular velocity error signal 113, according to a generally-employed control logic such as PID (Proportional-plus-Integral-plus-Derivative) control rule. Then, the reaction wheel 106 is driven based on the attitude control signal 111 to generate and apply control torque to the artificial satellite. As a result, maneuver takes place in the satellite dynamics 100 while the attitude error caused by the thruster 108 during the maneuver is compensated by the control torque from the reaction wheel 106. The attitude of the satellite dynamics 100 is controlled during the maneuver by the sum of the control torque generated by the thruster 108 and the control torque generated by the reaction wheel 106.

FIG. 10 is a block diagram showing a configuration of another exemplary conventional maneuver device. The maneuver device shown in FIG. 10 represents those without a thruster. The configuration of the maneuver device shown in FIG. 10 differs from the maneuver device shown in FIG. 9 in that it has no thruster, and that a feed forward torque instruction signal 110 generated by a feed forward torque instruction signal generator 107 is added to an attitude control signal 111 generated by an attitude control signal calculator 105, and the resulting signal is input to a reaction wheel 106. Other than these differences, the configuration of the device shown in FIG. 10 is the same as that shown in FIG. 9.

In the maneuver device shown in FIG. 10, the reaction wheel 106 generates torque based on a sum signal of the feed forward torque instruction signal 110 and the attitude control signal 111, and uses the torque to perform maneuver. The maneuver device shown in FIG. 10 has an advantage in that it only uses the reaction wheel 106 as an attitude control actuator and thus can save an amount of fuel required by the thruster 108 (see FIG. 9). However, a maneuver rate that can be achieved decreases compared to that of the maneuver device shown in FIG. 9.

Thus, the conventional maneuver devices have the following problems. In the maneuver devices shown in FIGS. 9 and 10, the attitude control signal calculator 105 includes a PID controller and the like and thus requires a certain period of time to compensate for the above-mentioned attitude error. As a result, compensation for the attitude error cannot accurately follow the movement of the artificial satellite during the maneuver, and instead increases the attitude error. This also causes a problem that the setting time required becomes longer to achieve the target values of the attitude angle and the angular velocity for the maneuver. As long as the PID controller is used in the attitude control signal calculator 105, there is a limit to the improvement in the setting time (i.e., shortening of time), and thus cannot satisfy severe specification requirements.

In view of the above-described problems, the present invention has an objective of providing a maneuver device for an artificial satellite, in which an attitude error is small and setting time required to achieve a target attitude is short.

SUMMARY OF THE INVENTION

In one aspect of the invention, a maneuver device for an artificial satellite comprises: a feed forward torque instruction signal generator for outputting feed forward torque instruction signals as a profile of torque to be applied to the artificial satellite according to a maneuver plan; a thruster for generating control torque for driving the artificial satellite based on the feed forward torque instruction signal; an angular velocity detector for detecting and outputting an angular velocity of the artificial satellite as a detected angular velocity signal; a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel to which the disturbance compensating signal is input, and which, in turn, generates control torque for driving the artificial satellite based-on-the input disturbance compensating signal.

According to the present invention, a disturbance compensating signal calculator is provided which estimates disturbance torque (torque other than the torque indicated by the feed forward torque instruction signal) based on a feed forward torque instruction signal for a thruster and a detected angular velocity signal, and outputs a compensating signal for the disturbance torque so that the artificial satellite will correctly obey the feed forward torque instruction signal. As a result, obedient errors of the attitude angle and the angular velocity during maneuver can be reduced and setting time required for maneuver can be shortened. The disturbance torque includes torque applied to the artificial satellite from the external environment such as solar radiation pressure torque, gravity gradient torque, torque caused by a plume of the thruster, residual magnetic torque and aerodynamic torque, as well as torque caused by an error of the feed forward torque instruction signal, an output error of the reaction wheel and a control error caused by discrete outputs generated by the thruster.

In another aspect of the invention, a maneuver device for an artificial satellite comprises: a feed forward torque instruction signal generator for outputting feed forward torque instruction signals as a profile of torque to be applied to the artificial satellite according to a maneuver plan; a thruster for generating control torque for driving the artificial satellite based on the feed forward torque instruction signal; a target attitude angle value generator for generating and outputting a target value of an attitude angle of the artificial satellite as a target attitude angle signal; a target angular velocity value generator for generating and outputting a target value of an angular velocity of the artificial satellite as a target angular velocity signal; an attitude angle detector for detecting and outputting an attitude angle of the artificial satellite as a detected attitude angle signal; an angular velocity detector for detecting and outputting an angular velocity of the artificial satellite as a detected angular velocity signal; an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; a disturbance compensating signal calculator to which the feed forward torque instruction signal and the detected angular velocity signal are input, and which, in turn, outputs, to a reaction wheel, a disturbance compensating signal for compensating for disturbance torque applied to the artificial satellite during maneuver; and the reaction wheel which generates control torque for driving the artificial satellite based on the attitude control signal and the disturbance compensating signal.

The device of the invention is provided with the attitude control signal calculator, which, together with the disturbance compensating signal calculator, is able to reduce the obedient errors of the attitude angle and the angular velocity during maneuver and to shorten the setting time required for maneuver. In the artificial satellite maneuver device of the invention, disturbance torque applied to the artificial satellite is estimated based on the feed forward torque instruction signal and the angular velocity of the artificial satellite corresponding to the feed forward torque instruction signal. Therefore, a disturbance compensating signal which is supposed to compensate for this estimated disturbance torque contains a signal that eliminates the effect of the attitude control signal. For this reason, the disturbance compensating signal could deteriorate and cancel control accuracy of the attitude control signal calculator. Since the present invention aims at keeping the actual movement of the satellite to obey the target movement indicated by the feed forward torque instruction signal, it can be neglected even if the effect of the attitude control signal calculator is weakened.

In yet another aspect of the invention, a maneuver device for an artificial satellite comprises: a feed forward torque instruction signal generator for outputting feed forward torque instruction signals as a profile of torque to be applied to the artificial satellite according to a maneuver plan; a disturbance compensating signal calculator for outputting a disturbance compensating signal for compensating for disturbance torque applied to the artificial satellite during maneuver; a sum signal calculator to which the feed forward torque instruction signal and the disturbance compensating signal are input, and which, in turn, outputs a sum signal of these input signals at a predetermined timing; a thruster for generating control torque for driving the artificial satellite based on the sum signal; and an angular velocity detector for detecting and outputting an angular velocity of the artificial satellite as a detected angular velocity signal. The sum signal and the detected angular velocity signal are input to the disturbance compensating signal calculator, which, in turn, generates and outputs a new disturbance compensating signal at a predetermined timing.

In still yet another aspect of the invention, a maneuver device for an artificial satellite comprises: a feed forward torque instruction signal generator for outputting feed forward torque instruction signals as a profile of torque to be applied to the artificial satellite according to a maneuver plan; a disturbance compensating signal calculator for outputting a disturbance compensating signal for compensating for disturbance torque applied to the artificial satellite; a sum signal calculator to which the feed forward torque instruction signal and the disturbance compensating signal are input, and which, in turn, outputs a sum signal of these input signals at a predetermined timing; a thruster for generating control torque for driving the artificial satellite based on the sum signal; a target attitude angle value generator for generating and outputting a target value of an attitude angle of the artificial satellite as a target attitude angle signal; a target angular velocity value generator for generating and outputting a target value of an angular velocity of the artificial satellite as a target angular velocity signal; an attitude angle detector for detecting and outputting an attitude angle of the artificial satellite as a detected attitude angle signal; an angular velocity detector for detecting and outputting an angular velocity of the artificial satellite as a detected angular velocity signal; an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; and a reaction wheel for generating control torque for driving the artificial satellite based on the attitude control signal. The sum signal and the detected angular velocity signal are input to the disturbance compensating signal calculator, which, in turn, generates and outputs a new disturbance compensating signal at a predetermined timing.

In still another aspect of the invention, a maneuver device for an artificial satellite comprises: a feed forward torque instruction signal generator for outputting feed forward torque instruction signals as a profile of torque to be applied to the artificial satellite according to a maneuver plan; a thruster for generating control torque for driving the artificial satellite based on the feed forward torque instruction signal; a target attitude angle value generator for generating and outputting a target value of an attitude angle of the artificial satellite as a target attitude angle signal; a target angular velocity value generator for generating and outputting a target value of an angular velocity of the artificial satellite as a target angular velocity signal; an attitude angle detector for detecting and outputting an attitude angle of the artificial satellite as a detected attitude angle signal; an angular velocity detector for detecting and outputting an angular velocity of the artificial satellite as a detected angular velocity signal; an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; a disturbance compensating signal calculator for outputting a disturbance compensating signal for compensating for disturbance torque applied to the artificial satellite during maneuver; a sum signal calculator to which the attitude control signal and the disturbance compensating signal are input, and which, in turn, outputs a sum signal of these input signals at a predetermined timing; and a reaction wheel for generating control torque for driving the artificial satellite based on the input sum signal. The difference signal between the detected angular velocity signal and the target angular velocity signal as well as the sum signal are input to the disturbance compensating signal calculator, which, in turn, generates and outputs a new disturbance compensating signal at a predetermined timing.

In the artificial satellite maneuver device of the invention, disturbance torque applied to the artificial satellite is estimated based on a sum signal of the attitude control signal and the disturbance compensating signal as well as a difference signal between the detected angular velocity signal and the target angular velocity signal. Therefore, potential canceling relationship between the attitude control signal calculator and the disturbance compensating signal calculator can be improved while keeping the actual movement of the artificial satellite to follow the movement indicated by the feed forward torque instruction signal. The advantage of the disturbance compensating signal calculator can be taken out as an output as much as possible. As a result, the characteristic of the artificial satellite to achieve the target movement can be improved, and highly accurate response can be obtained even in the course of maneuver.

In yet another aspect of the invention, a maneuver device for an artificial satellite comprises: a feed forward torque instruction signal generator for outputting feed forward torque instruction signals as a profile of torque to be applied to the artificial satellite according to a maneuver plan; an angular velocity detector for detecting and outputting an angular velocity of the artificial satellite as a detected angular velocity signal; a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel for generating control torque for driving the artificial satellite based on the disturbance compensating signal and the feed forward torque instruction signal.

According to the present invention, even when a thruster is not used, compensation can be carried out with the disturbance compensating signal by using only the reaction wheel.

In yet another aspect of the invention, a maneuver device for an artificial satellite comprises: a feed forward torque instruction signal generator for outputting feed forward torque instruction signals as a profile of torque to be applied to the artificial satellite according to a maneuver plan; a target attitude angle value generator for generating and outputting a target value of an attitude angle of the artificial satellite as a target attitude angle signal; a target angular velocity value generator for generating and outputting a target value of an angular velocity of the artificial satellite as a target angular velocity signal; an attitude angle detector for detecting and outputting an attitude angle of the artificial satellite as a detected attitude angle signal; an angular velocity detector for detecting and outputting an angular velocity of the artificial satellite as a detected angular velocity signal; an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel for generating control torque for driving the artificial satellite based on the attitude control signal, the disturbance compensating signal and the feed forward torque instruction signal.

In another aspect of the invention, a maneuver device for an artificial satellite comprises: a feed forward torque instruction signal generator for outputting feed forward torque instruction signals as a profile of torque to be applied to the artificial satellite according to a maneuver plan; a disturbance compensating signal calculator for outputting a disturbance compensating signal for compensating for disturbance torque applied to the artificial satellite during maneuver; an angular velocity detector for detecting and outputting an angular velocity of the artificial satellite as a detected angular velocity signal; a sum signal calculator to which the feed forward torque instruction signal and the disturbance compensating signal are input, and which, in turn, outputs a sum signal of these input signals at a predetermined timing; and a reaction wheel for generating control torque for driving the artificial satellite based on the sum signal. The sum signal and the detected angular velocity signal are input to the disturbance compensating signal calculator, which, in turn, generates and outputs a new disturbance compensating signal at a predetermined timing.

In yet another aspect of the invention, a maneuver device for an artificial satellite comprises: a feed forward torque instruction signal generator for outputting feed forward torque instruction signals as a profile of torque to be applied to the artificial satellite according to a maneuver plan; a disturbance compensating signal calculator for outputting a disturbance compensating signal for compensating for disturbance torque applied to the artificial satellite during maneuver; a target attitude angle value generator for generating and outputting a target value of an attitude angle of the artificial satellite as a target attitude angle signal; a target angular velocity value generator for generating and outputting a target value of an angular velocity of the artificial satellite as a target angular velocity signal; an attitude angle detector for detecting and outputting an attitude angle of the artificial satellite as a detected attitude angle signal; an angular velocity detector for detecting and outputting an angular velocity of the artificial satellite as a detected angular velocity signal; an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; a sum signal calculator to which the feed forward torque instruction signal and the disturbance compensating signal are input, and which, in turn, outputs a sum signal of these input signals at a predetermined timing; and a reaction wheel for generating control torque for driving the artificial satellite based on the sum signal and the attitude control signal. The sum signal and the detected angular velocity signal are input to the disturbance compensating signal calculator, which, in turn, generates and outputs a new disturbance compensating signal at a predetermined timing.

In still yet another aspect of the invention, a maneuver device for an artificial satellite comprises: a feed forward torque instruction signal generator for outputting feed forward torque instruction signals as a profile of torque to be applied to the artificial satellite according to a maneuver plan; a target attitude angle value generator for generating and outputting a target value of an attitude angle of the artificial satellite as a target attitude angle signal; a target angular velocity value generator for generating and outputting a target value of an angular velocity of the artificial satellite as a target angular velocity signal; an attitude angle detector for detecting and outputting an attitude angle of the artificial satellite as a detected attitude angle signal; an angular velocity detector for detecting and outputting an angular velocity of the artificial satellite as a detected angular velocity signal; an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; a disturbance compensating signal calculator for outputting a disturbance compensating signal for compensating for disturbance torque applied to the artificial satellite during maneuver; a sum signal calculator to which the attitude control signal and the disturbance compensating signal are input, and which, outputs a sum signal of these input signals at a predetermined timing; and a reaction wheel for generating control torque for driving the artificial satellite based on the sum signal and the feed forward torque instruction signal. The sum signal and the difference signal between the detected angular velocity signal and the target angular velocity signal are input to the disturbance compensating signal calculator, which, in turn, generates and outputs a new disturbance compensating signal at a predetermined timing.

DETAILED DESCRIPTION OF THE INVENTION

Figure 1:
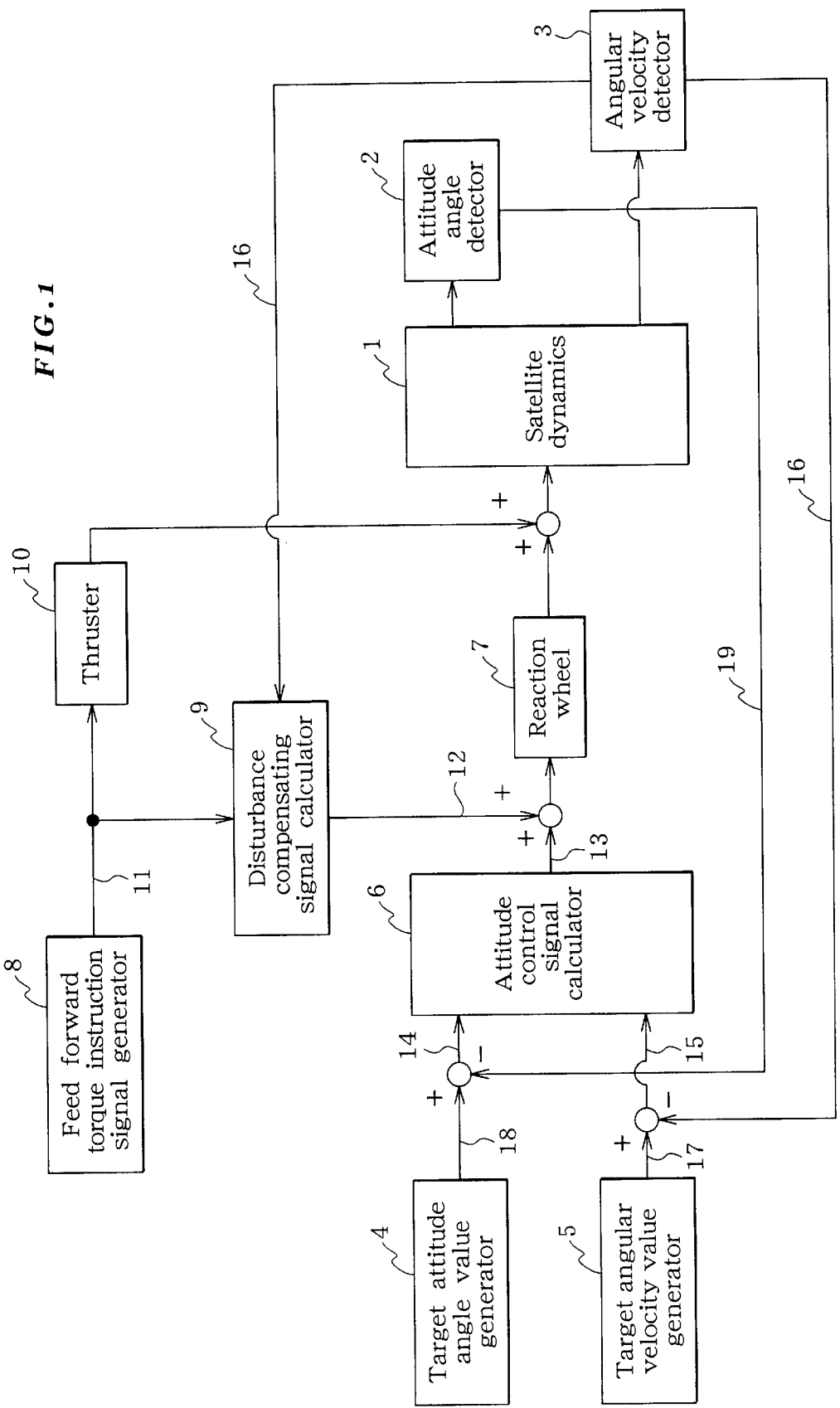
FIG. 1 is a block diagram showing a configuration of a maneuver device according to a first example of the invention.

Hereinafter, examples of the present invention will be described in detail with reference to the accompanying drawings. First, an artificial satellite maneuver device according to a first example of the invention will be described. FIG. 1 is a block diagram showing a configuration of a maneuver device of the present example. Referring to the figure, the maneuver device is provided with a feed forward torque instruction signal generator 8 for outputting a feed forward torque instruction signal 11 based on a pre-programmed maneuver plan, and a thruster 10 for generating control torque based on the input feed forward torque instruction signal 11. The control torque is applied to the artificial satellite incorporating this maneuver device. The movement characteristics of the artificial satellite are represented as satellite dynamics 1.

The device further includes an attitude angle detector 2 for detecting and outputting an attitude angle of the satellite dynamics 1 as a detected attitude angle signal 19, an angular velocity detector 3 for detecting and outputting an angular velocity of the satellite dynamics 1 as a detected angular velocity signal 16, a target attitude angle value generator 4 for generating and outputting a target value of an attitude angle of the satellite dynamics 1 as a target attitude angle signal 18, and a target angular velocity value generator 5 for generating and outputting a target value of an angular velocity of the satellite dynamics 1 as a target angular velocity signal 17. The attitude angle detector 2 is configured with a star tracker (STT) and Inertial Reference Unit (IRU). The angular velocity detector 3 can readily be configured with the IRU, a gyro or the like.

The maneuver device is further provided with an attitude control signal calculator 6 to which an attitude angle error signal 14 and an angular velocity error signal 15 are input, and which, in turn, outputs an attitude control signal 13. The attitude angle error signal 14 is a difference signal between the target attitude angle signal 18 and the detected attitude angle signal 19, while the angular velocity error signal 15 is a difference signal between the target angular velocity signal 17 and the detected angular velocity signal 16. A PID controller or the like may be used as the attitude control signal calculator 6. The maneuver device is further provided with a disturbance compensating signal calculator 9 to which the feed forward torque instruction signal 11 and the detected angular velocity signal 16 are input, and which, in turn, outputs a disturbance compensating signal 12. The maneuver device further includes a reaction wheel 7 to which the attitude control signal 13 and the disturbance compensating signal 12 are input, and which, in turn, generates control torque based on these input signals.

Next, operations carried out by the maneuver device according to the present example will be described. First, the feed forward torque instruction signal generator 8 generates a feed forward torque instruction signal 11 indicating torque to be given to each axis of the satellite dynamics 1 at each time point according to the maneuver plan, and outputs the generated signal 11 to the thruster 10 as well as to the disturbance compensating signal calculator 9. The thruster 10 is driven based on the input feed forward torque instruction signal 11, and generates and applies control torque to the satellite dynamics 1.

Since the state of the satellite dynamics 1 is not fed back to the feed forward torque instruction signal generator 8, the feed forward torque instruction signal generator 8 simply outputs the feed forward torque instruction signal 11 based on the pre-calculated maneuver plan. As a result, disturbance on the satellite dynamics 1 that results from the external environment, an error of the feed forward torque instruction signal 11, an output error of the reaction wheel 7 or a control error caused by a discrete output from the thruster 10 may become disturbance torque that results in an attitude error of the artificial satellite.

This attitude error is compensated by a system including the attitude angle detector 2, the angular velocity detector 3, the target attitude angle value generator 4, the target angular velocity value generator 5 and the attitude control signal calculator 6. In order to realize maneuver with the above-described feed forward torque instruction signal generator 8 and the thruster 10, the target attitude angle value generator 4 generates a target value of the attitude angle at each time point and outputs it as a target attitude angle signal 18 toward the attitude control signal calculator 6, while the target angular velocity value generator 5 generates a target value of the attitude angle of the artificial satellite at each time point and outputs it as a target angular velocity signal 17 toward the attitude control signal calculator 6. The attitude angle detector 2 detects the actual attitude angle of the artificial satellite and outputs it as a detected attitude angle signal 19 toward the attitude control signal calculator 6, while the angular velocity detector 3 detects the actual angular velocity of the artificial satellite and outputs it as a detected angular velocity signal 16 toward the attitude control signal calculator 6.

A difference signal between the target attitude angle signal 18 and the detected attitude angle signal 19 as well as a difference signal between the target angular velocity signal 17 and the detected angular velocity signal 16 are input to the attitude control signal calculator 6 as an attitude angle error signal 14 and an angular velocity error signal 15, respectively. The attitude control signal calculator 6 generates an attitude control signal 13 according to a generally-employed control logic such as PID control rule, based on the attitude angle error signal 14 and the angular velocity error signal 15. Then, the attitude control signal calculator 6 outputs the generated attitude control signal 13 toward the reaction wheel 7.

The feed forward torque instruction signal 11 and the detected angular velocity signal 16 are input to the disturbance compensating signal calculator 9 which, in turn, generates a disturbance compensating signal 12 based on these input signals and outputs it toward the reaction wheel 7. The disturbance compensating signal 12 is a signal for compensating for disturbance torque applied to the satellite dynamics 1 during maneuver.

The sum signal of the disturbance compensating signal 12 and the attitude control signal 13 is input to the reaction wheel 7 which, based on the sum signal, is driven to generate and apply control torque to the satellite dynamics 1. As a result, maneuver is carried out while the attitude error of the satellite dynamics 1 caused by the thruster 10 during maneuver is compensated by the control torque generated by the reaction wheel 7. In other words, maneuver is carried out while the attitude of the satellite dynamics 1 is controlled by the sum of the control torque generated by the thruster 10 and the control torque generated by the reaction wheel 7.

Figure 2:
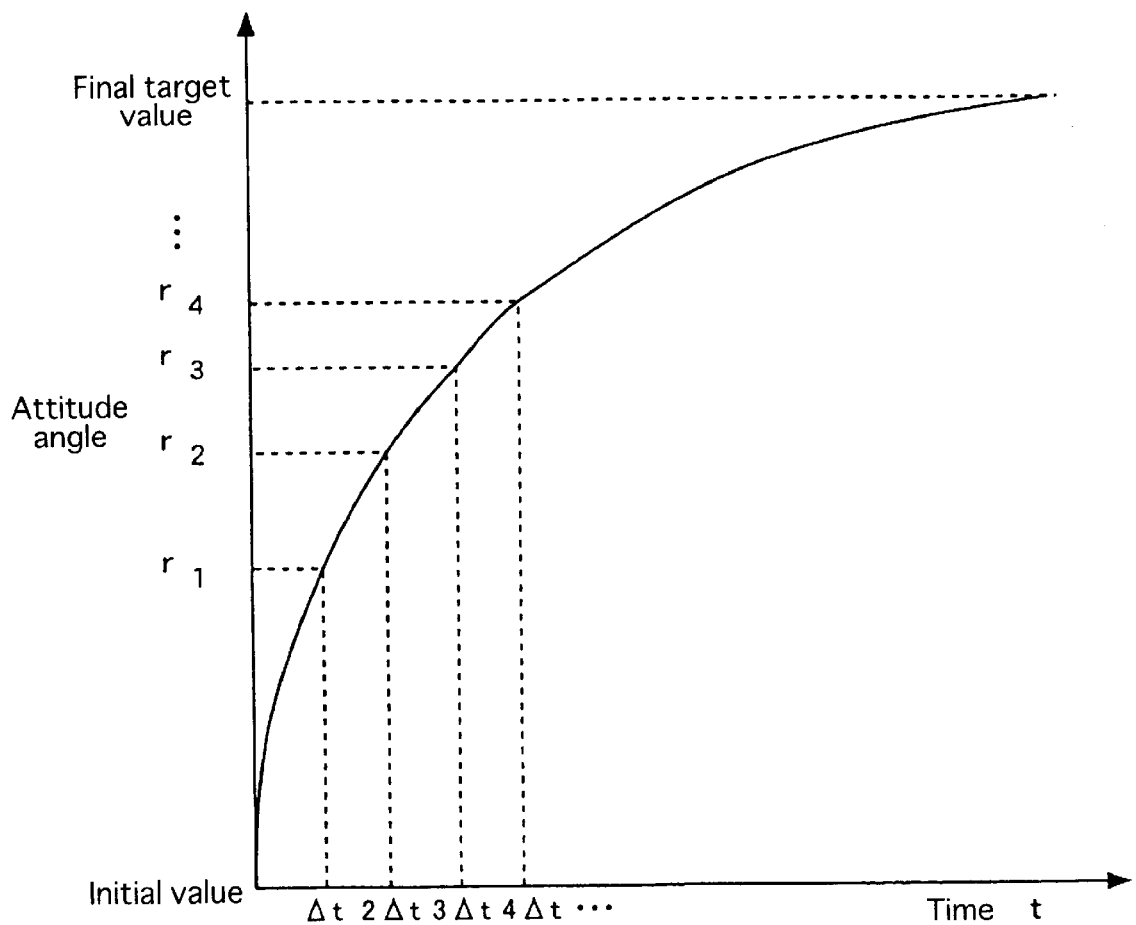
FIG. 2 is a graph showing relationship between an estimated target value generated by a target attitude angle value generator 4 at each control period and a final target value for the entire maneuver, where the horizontal axis represents time after the initiation of maneuver and the vertical axis represents an attitude angle at each time point.

Hereinafter, the operations carried out by the target attitude angle value generator 4, the target angular velocity value generator 5 and the attitude control signal calculator 6 as well as the operation carried out by the disturbance compensating signal calculator 9 will be described in more detail. FIG. 2 is a graph representing relationship between an estimated target value generated by the target attitude angle value generator 4 at each control period and the final target value for the entire maneuver, where the horizontal axis represents time after the initiation of the maneuver and the vertical axis represents the attitude angle at each time point. In FIG. 2, Δt represents the sampling time of the attitude control signal calculator 6.

The target attitude angle value generator 4 and the target angular velocity value generator 5 have functions to output the final attitude angle and the final angular velocity according to the maneuver plan as a target attitude angle signal 18 and a target attitude angle signal 17, respectively, as well as functions to generate and output an estimated attitude angle and an estimated angular velocity at each controlling time point as a target attitude angle signal 18 and a target attitude angle signal 17 for each sampling period, respectively, which can be derived in advance from the relationship between the entire change in the attitude and the control sampling period of the attitude control signal calculator 6.

As maneuver initiates by the operation by the feed forward torque instruction signal generator 8 at t=0, the attitude angle of the artificial satellite starts to change. Following the initiation of the maneuver, the target attitude angle value generator 4 calculates the target value r1 of the attitude angle at Δt (t=Δt), and outputs the result as a target attitude angle signal 18 toward the attitude control signal calculator 6. At t=Δt, the attitude control signal calculator 6 samples the detected attitude angle signal 19 to obtain an error between the target attitude angle value (r1) and the actual attitude angle at t=Δt based on the difference signal between the target attitude angle signal 18 and the detected attitude angle signal 19. Similarly, the target angular velocity value generator 5 generates and outputs a target angular velocity value at t=Δt as a target angular velocity signal 17 toward the attitude control signal calculator 6. The attitude control signal calculator 6 calculates an error between the target angular velocity value and the actual angular velocity at t=Δt. The attitude control signal calculator 6 generates an attitude control signal 13 from these attitude angle and angular velocity errors according to the PID control rule or the like.

Similar operation is carried out at t=2 Δt. Specifically, the target attitude angle value generator 4 calculates and outputs a target attitude angle value r2 at t=2 Δt as a target attitude angle signal 18 toward the attitude control signal calculator 6. The target angular velocity value generator 5 calculates and outputs a target angular velocity value at t=2 Δt toward the attitude control signal calculator 6. The attitude control signal calculator 6 obtains errors between the target values and the detected values of the attitude angle and the angular velocity at t=2 Δt to generate an attitude control signal 13. Similar operation is repeated for every Δt.

In order to keep the satellite dynamics 1 to correctly obey the feed forward torque instruction signal 11, the disturbance compensating signal calculator 9 generates a compensating signal for the disturbance torque (disturbance compensating signal 12) by estimating the disturbance torque (i.e., torque applied to the satellite dynamics 1 other than the torque generated based on the feed forward torque instruction signal 11) based on the feed forward torque instruction signal 11 output from the feed forward torque instruction signal generator 8 and the detected angular velocity signal 16 output from the angular velocity detector 3.

In general, the satellite dynamics 1 have non-linear characteristics. If, however, the characteristics of the satellite dynamics 1 of the present example are linearized for respective axes, and the flexibility is neglected, dynamics at each axis can be represented by the following expression for rigid body motion, $$J\ddot{\theta} = T$$

where J is the moment of inertia for a corresponding axis of the artificial satellite, θ is the attitude angle of the satellite dynamics 1 and T is the input torque.

The following expression (1) can be derived through Laplace transformation of the above expression, $$Js^2\theta = T \quad (1)$$

where s is the Laplace operator.

Thus, a transfer function representing the relationship between the input torque T and the attitude angle θ of the satellite dynamics 1, namely, the rigid body satellite dynamics is given by the following expression, $$\frac{\theta}{T} = \frac{1}{Js^2}$$

Figure 3:
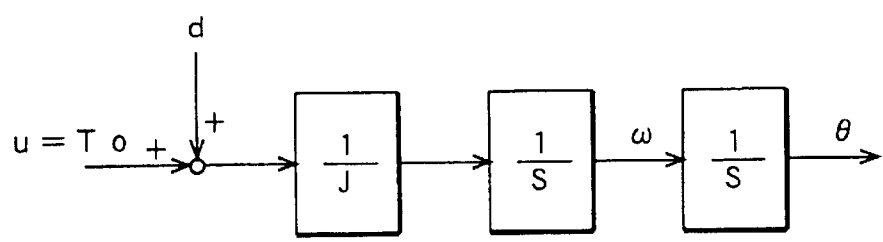
FIG. 3 is a block diagram showing relationship of input and output of Expression (1)

FIG. 3 is a block diagram showing relationship between the inputs and outputs of the above expression (1), where u is the feed forward torque instruction signal 11, $T_0$ is the torque generated by the thruster 10 based on the feed forward torque instruction signal 11, d is the disturbance torque and ω is the angular velocity detected by the angular velocity detector 3. Referring to the figure, the sum of the torque $T_0$ and the disturbance torque d generated by the thruster 10 is applied to the satellite dynamics having the moment of inertia J. The angular velocity ω is obtained through integration of the obtained torque, and the attitude angle θ of the satellite dynamics 1 is obtained through further integration. Therefore, the following expression is obtained.

$$\omega = \frac{1}{Js} \times (T_0 + d)$$

When $$T_0 = u,$$

then, $$\omega = \frac{1}{Js} \times (u + d).$$

Thus, the disturbance torque d can be represented by the following expression (2), $$d = Js\omega - u \quad (2)$$

From the above expression (2), a signal d* for compensating for the disturbance torque d can be given by the following expression, $$d^* = -d = u - Js\omega$$

However, since the signal d* includes a differential term, this expression cannot be realized by itself. In order to realize the signal d*, a filter F(s) with an order difference of 1 or more is required. Accordingly, the following second order low pass filter F(s) is incorporated to realize the signal d*.

$$F(s) = \frac{\alpha\beta}{(s+\alpha)(s+\beta)}$$

Thus, torque $u_d$ indicated by the disturbance compensating signal 12 generated by the disturbance compensating signal calculator 9 is given by the following expression (3), $$d^* \times F(s) = u_d = \frac{\alpha\beta}{(s+\alpha)(s+\beta)} \times (u - js\omega) \quad (3)$$

where $\alpha$ and $\beta$ are constants indicating a frequency range of the disturbance to be compensated, which are design parameters for adjusting compensation for the disturbance, and which need to be set to values considering the wasted time occurring in the actual satellite dynamics 1, the attitude control system and units, and the like. The disturbance compensating signal calculator 9 outputs a disturbance compensating signal 12 given by the above expression (3). Then, the reaction wheel 7 generates control torque based on a sum signal of the disturbance compensating signal 12 and the attitude control signal 13.

As described above, the maneuver device for an artificial satellite according to the present example differs from a conventional maneuver device in that it incorporates a disturbance compensating signal calculator 9 as shown in FIG. 1 for the purposes of reducing obedient errors of the attitude angle and the angular velocity caused by the thruster 10 during maneuver as well as shortening the setting time, based on the feed forward torque instruction signal 11 output from the feed forward torque instruction signal generator 8 according to the maneuver plan.

The maneuver device of the present invention performs attitude maneuver of the satellite based on two types of control torque, namely, the control torque generated by the thruster 10 based on the feed forward torque instruction signal 11 and the control torque generated by the reaction wheel 7 based on a sum signal of the attitude control signal 13 and the disturbance compensating signal 12. The disturbance compensating signal calculator 9 generates the disturbance compensating signal 12 based on the above expression (3) and combines the obtained disturbance compensating signal 12 with the feed forward torque instruction signal 11 according to an ideal maneuver profile to drive the reaction wheel 7. Accordingly, the attitude error caused during the maneuver can be reduced to a greater extent as compared to a conventional maneuver device. As a result, the setting time for maneuver can be shortened and constantly speedy and accurate attitude maneuver can be realized.

The maneuver device of the present example is characterized in that it calculates the disturbance compensating signal 12 according to the above expression (3) based on the detected angular velocity signal 16 and the feed forward torque instruction signal 11 to accurately compensate for a maneuver error caused in the satellite dynamics 1. Such an advantage cannot be realized by only adding the disturbance compensating signal calculator 9 to a conventional maneuver device.

The disturbance compensating signal calculator 9 may be configured with a general integrated circuit such that the above expression (3) is carried out by a program written in the integrated circuit. Alternatively, an electric circuit can be employed to carry out the above expression (3).

The disturbance torque d represented by the above expression (2) may also be estimated from the attitude angle signal 19 detected by the attitude angle detector 2 and the feed forward torque instruction signal 11. In this case, the following third order low pass filter $F_2(s)$ is used.

$$F_2(s) = \frac{\alpha\beta\gamma}{(s+\alpha)(s+\beta)(s+\gamma)}$$

Thus, the disturbance torque d is given by the following expression (4).

$$d = Js^2\theta - u \quad (4)$$

When $u_{d2}$ is the torque indicated by the disturbance compensating signal generated by the disturbance compensating signal calculator, and $\alpha$, $\beta$ and $\gamma$ are constants indicating the frequency range of the disturbance to be compensated, $u_{d2}$ is given by the following expression (5).

$$u_{d2} = \frac{\alpha\beta\gamma}{(s+\alpha)(s+\beta)(s+\gamma)} \times (u - Js^2\theta) \quad (5)$$

Accordingly, the disturbance compensating signal calculator can generate a disturbance compensating signal from the attitude angle signal 19 and the feed forward torque instruction signal 11 to compensate for an attitude error of the artificial satellite.

Figure 4:
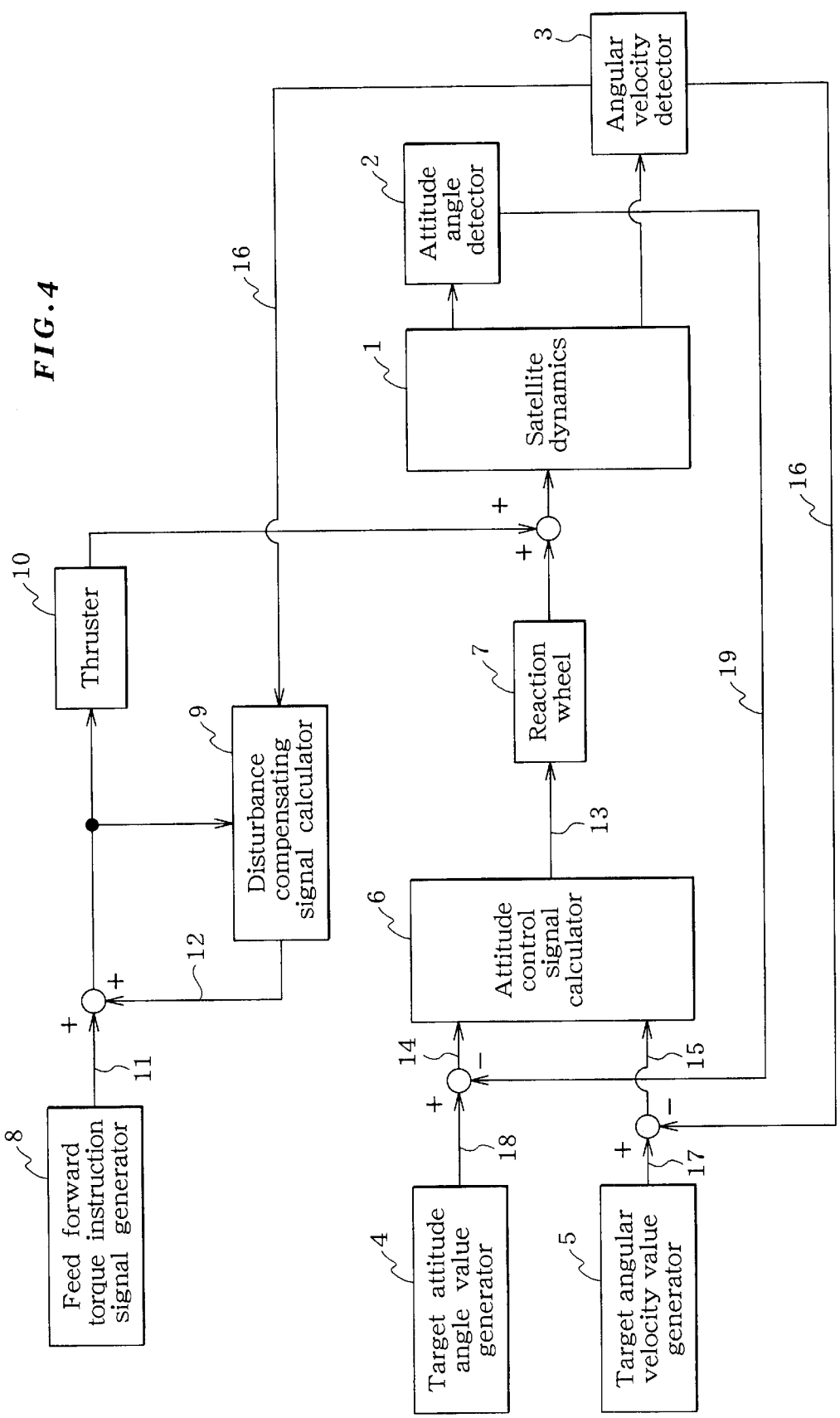
FIG. 4 is a block diagram showing a configuration of a maneuver device according to a second example of the invention.

Hereinafter, an artificial satellite maneuver device according to a second example of the invention will be described. FIG. 4 is a block diagram showing a configuration of a maneuver device according to the present example. Referring to the figure, the maneuver device of the present example is provided with a sum signal calculator (not shown) at the output side of a feed forward torque instruction signal generator 8. This sum signal calculator is connected to the input terminal of a thruster 10 and the input and output terminals of a disturbance compensating signal calculator 9. The disturbance compensating signal calculator 9 is arranged such that it outputs a disturbance compensating signal 12 to the sum signal calculator, that a sum signal of the disturbance compensating signal 12 and the feed forward torque instruction signal 11 output from the sum signal calculator is input to the disturbance compensating signal calculator 9, and that a detected angular velocity signal 16 output from an angular velocity detector 3 is input to the disturbance compensating signal calculator 9. Other than the above-described features, the configuration of the maneuver device of the present example is the same as that of the maneuver device according to the first example.

Next, operations carried out by the maneuver device of the present example will be described. As shown in FIG. 4, the disturbance compensating signal calculator 9 outputs a disturbance compensating signal 12 to the sum signal calculator (not shown). The sum signal calculator generates a sum signal of the disturbance compensating signal 12 and a feed forward torque instruction signal 11 output from the feed forward torque instruction signal generator 8. This sum signal is input to the thruster 10 as well as to the disturbance compensating signal calculator 9 at a predetermined timing. The disturbance compensating signal calculator 9 is also input with a detected angular velocity signal 16 output from the angular velocity detector 3. At this point, the disturbance compensating signal calculator 9 generates a new disturbance compensating signal 12 according to the above expression (3), where $u_d$ is the new disturbance compensating signal 12, u is the sum signal of the feed forward torque instruction signal 11 and the disturbance compensating signal 12, J is the moment of inertia of the artificial satellite, ω is the detected angular velocity signal 16, α and β are the constants indicating a frequency range of the disturbance to be compensated, and s is the Laplace operator. The resulting disturbance compensating signal 12 is output at a predetermined timing later than the timing of inputting the sum signal to the disturbance compensating signal calculator 9. In the maneuver device of the present example, the disturbance compensating signal 12 is not input to the reaction wheel 7. Other than the above-described operations, the operations of the maneuver device of the present example are the same as those of the maneuver device according to the first example.

In the maneuver device of the present example, the disturbance compensating signal calculator 9 generates a disturbance compensating signal 12 based on the above expression (3), and combines the resulting disturbance compensating signal 12 with the feed forward torque instruction signal 11 based on an ideal maneuver profile to drive the thruster 10. Accordingly, constantly speedy and accurate attitude maneuver can be realized.

Unlike the maneuver device of the first example where compensation takes place for the original feed forward torque instruction signal 11, the path of the disturbance compensating signal 12 is configured as a loop in the maneuver device of the present example and thus the device of the present example can compensate for the sum signal of the feed forward torque instruction signal 11 and the disturbance compensating signal 12 generated in a preceding sampling period. Accordingly, more accurate compensation, and thus more speedy and accurate maneuver can be realized.

Figure 5:
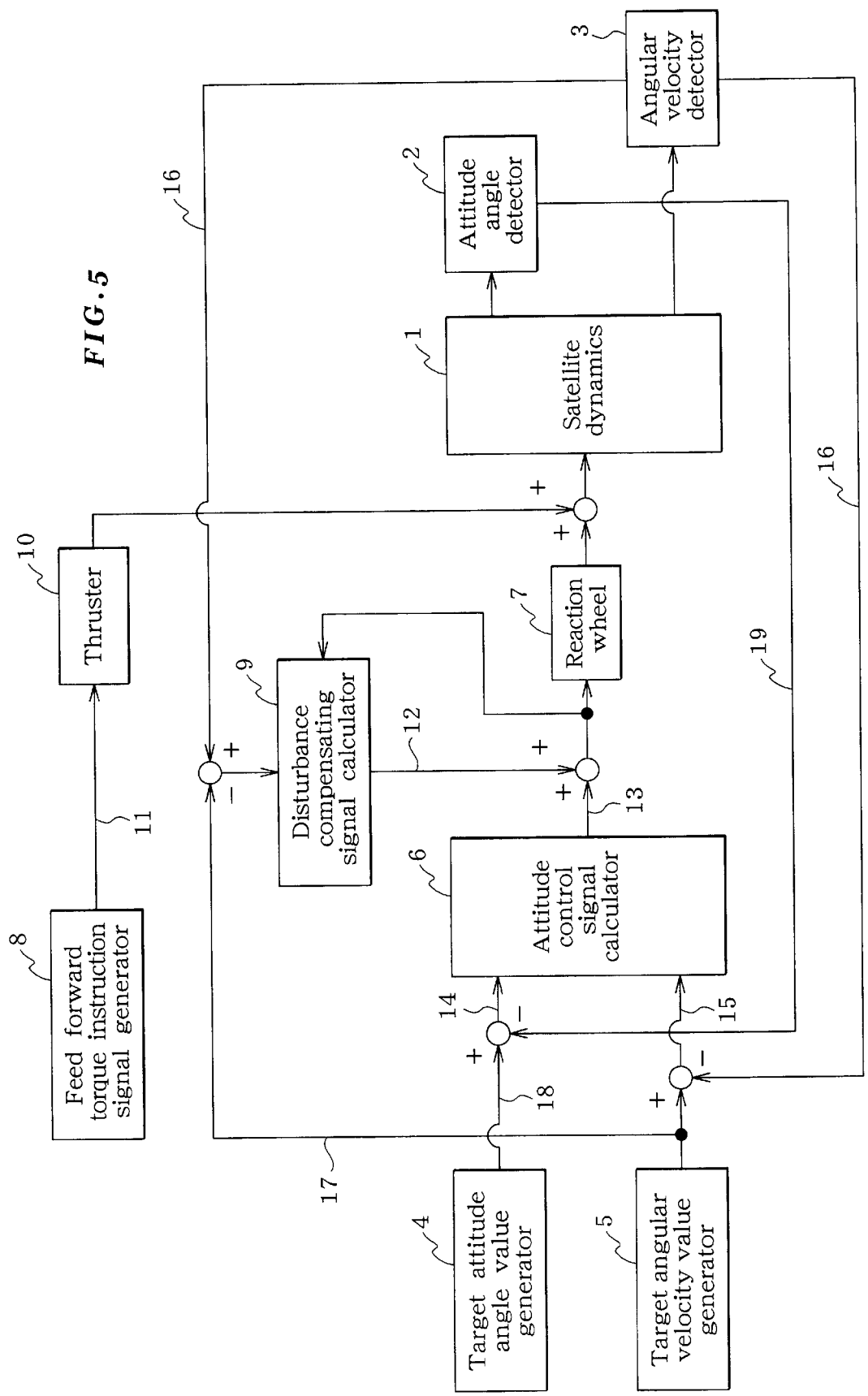
FIG. 5 is a block diagram showing a configuration of a maneuver device according to a third example of the invention.

Hereinafter, an artificial satellite maneuver device according to a third example of the invention will be described. FIG. 5 is a block diagram showing a configuration of the maneuver device according to the present example. In the maneuver device of the present example, a disturbance compensating signal calculator 9 is connected to an attitude control signal calculator 6 and a reaction wheel 7. The device is provided with a sum signal calculator (not shown) to which a disturbance compensating signal 12 and an attitude control signal 13 are input, and which generates and outputs a sum signal of the input signals to the reaction wheel 7 and the disturbance compensating signal calculator 9 at a predetermined timing. A difference signal between a detected angular velocity signal 16 and a target angular velocity signal 17, and a sum signal of the disturbance compensating signal 12 and the attitude control signal 13 output from the sum signal calculator are input to the disturbance compensating signal operational 9, which, in turn, outputs a disturbance compensating signal 12 to the sum signal calculator. Other than the above-described features, the configuration of the maneuver device of the present example is the same as that of the maneuver device of the first example.

Next, operations carried out by the maneuver device of the present example will be described. The disturbance compensating signal calculator 9 outputs a disturbance compensating signal 12 to the sum signal calculator. The sum signal calculator generates a sum signal of the disturbance compensating signal 12 and the attitude control signal 13 output from the attitude control signal calculator 6, and outputs the sum signal to the reaction wheel 7 as well as to the disturbance compensating signal calculator 9 at a predetermined timing. The disturbance compensating signal calculator 9 is also input with a difference signal between the detected angular velocity signal 16 from the angular velocity detector 3 and the target angular velocity signal 17 from the target angular velocity value generator 5. The disturbance compensating signal calculator 9 generates a new disturbance compensating signal 12 according to the above expression (3), where $u_d$ is the new disturbance compensating signal 12, u is the sum signal of the attitude control signal 13 and the disturbance compensating signal 12, J is the moment of inertia of the artificial satellite, ω is a difference signal between the detected angular velocity signal 16 and the target angular velocity signal 17, α and β are the constants indicating a frequency range of the disturbance to be compensated, and s is the Laplace operator. The resulting disturbance compensating signal 12 is output at a predetermined timing later than the timing of inputting the above-described sum signal to the disturbance compensating signal calculator 9. Other than the above-described operations, the operations of the maneuver device of the present example are the same as those of the maneuver device according to the first example.

In the above-described artificial satellite maneuver devices of the first and second examples, a disturbance torque d applied to the satellite dynamics 1 is estimated from the feed forward torque instruction signal 11 and the angular velocity of the artificial satellite corresponding to the feed forward torque instruction signal 11. Accordingly, the disturbance compensating signal 12 for compensating for the estimated disturbance torque contains a signal that eliminates the effect of the attitude control signal 13. For this reason, the disturbance compensating signal 12 could deteriorate and cancel control accuracy of the attitude control signal calculator 6. In the artificial satellite maneuver device of the third example, however, the disturbance torque d applied to the satellite dynamics 1 is estimated based on the sum signal of the attitude control signal 13 and the disturbance compensating signal 12 as well as a difference signal between the detected angular velocity signal 16 and the target angular velocity signal 17. Therefore, the actual movement of the satellite dynamics 1 obeys the movement indicated by the feed forward torque instruction signal 11 while the canceling relationship is improved. Since the advantage of the disturbance compensating signal calculator 9 can be taken out as an output as much as possible, the characteristic of obeying the pre-planned maneuver profile can be enhanced.

Figure 6:
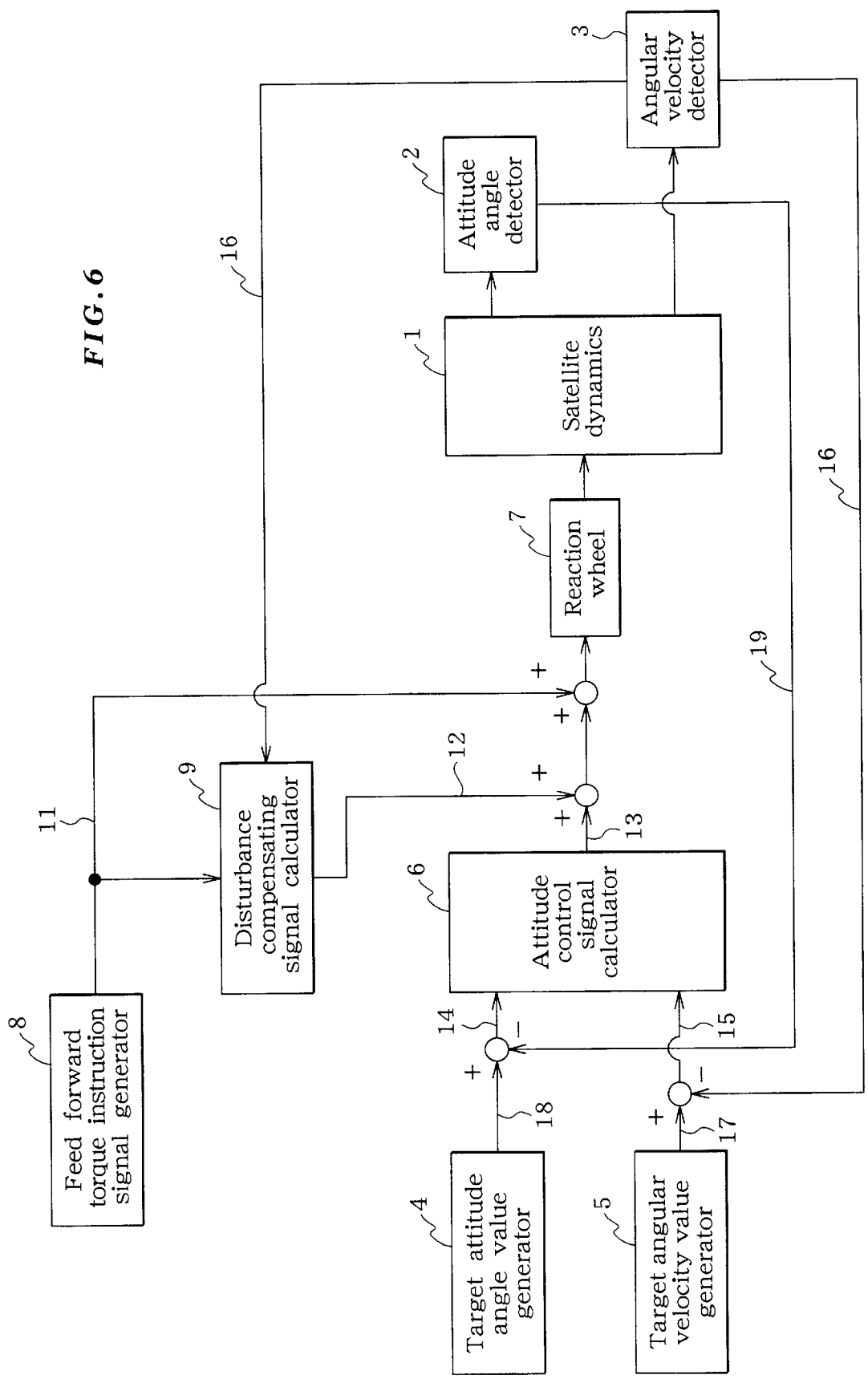
FIG. 6 is a block diagram showing a configuration of a maneuver device according to a fourth example of the invention.

Hereinafter, an artificial satellite maneuver device according to a fourth example of the present invention will be described. FIG. 6 is a block diagram showing a configuration of the maneuver device of the fourth example. Referring to the figure, the maneuver device of the present example does not employ a thruster 10 and only a reaction wheel 7 is provided as an attitude control actuator. Therefore, a feed forward torque instruction signal generator 8 outputs a feed forward torque instruction signal 11 to the reaction wheel 7. The reaction wheel 7 is input with a sum signal of a disturbance compensating signal 12, an attitude control signal 13 and a feed forward torque instruction signal 11. Other than the above-described features, the configuration of the maneuver device of the fourth example is the same as that of the maneuver device of the first example.

Next, operations carried out by the maneuver device of the present example will be described. As shown in FIG. 6, the feed forward torque instruction signal generator 8 outputs the feed forward torque instruction signal 11 according to the maneuver plan to the disturbance compensating signal calculator 9 and the reaction wheel 7. By the inputs of the feed forward torque instruction signal 11 and the detected angular velocity signal 16 from an angular velocity detector 3, a disturbance compensating signal calculator 9 generates a disturbance compensating signal 12 according to the above expression (3) and outputs the generated signal 12 to the reaction wheel 7. At the same time, an attitude control signal calculator 6 outputs an attitude control signal 13 to the reaction wheel 7. A sum signal of the attitude control signal 13 and the disturbance compensating signal 12 is added to the feed forward torque instruction signal 11, and the resulting signal is input to the reaction wheel 7. By the input of the sum signal, the reaction wheel 7 generates control torque for the satellite dynamics 1. Other than the above-described operations, the operations of the maneuver device of the present example are the same as those carried out by the maneuver device of the first example.

In the maneuver device of the present example, the disturbance compensating signal calculator 9 generates a disturbance compensating signal 12 according to the above expression (3). The obtained disturbance compensating signal 12 is combined with the feed forward torque instruction signal 11 that is based on an ideal maneuver profile to drive the reaction wheel 7, thereby realizing constantly speedy and accurate attitude maneuver. Even when a thruster 10 is not incorporated, the reaction wheel 7 can compensate for the disturbance compensating signal 12.

Figure 7:
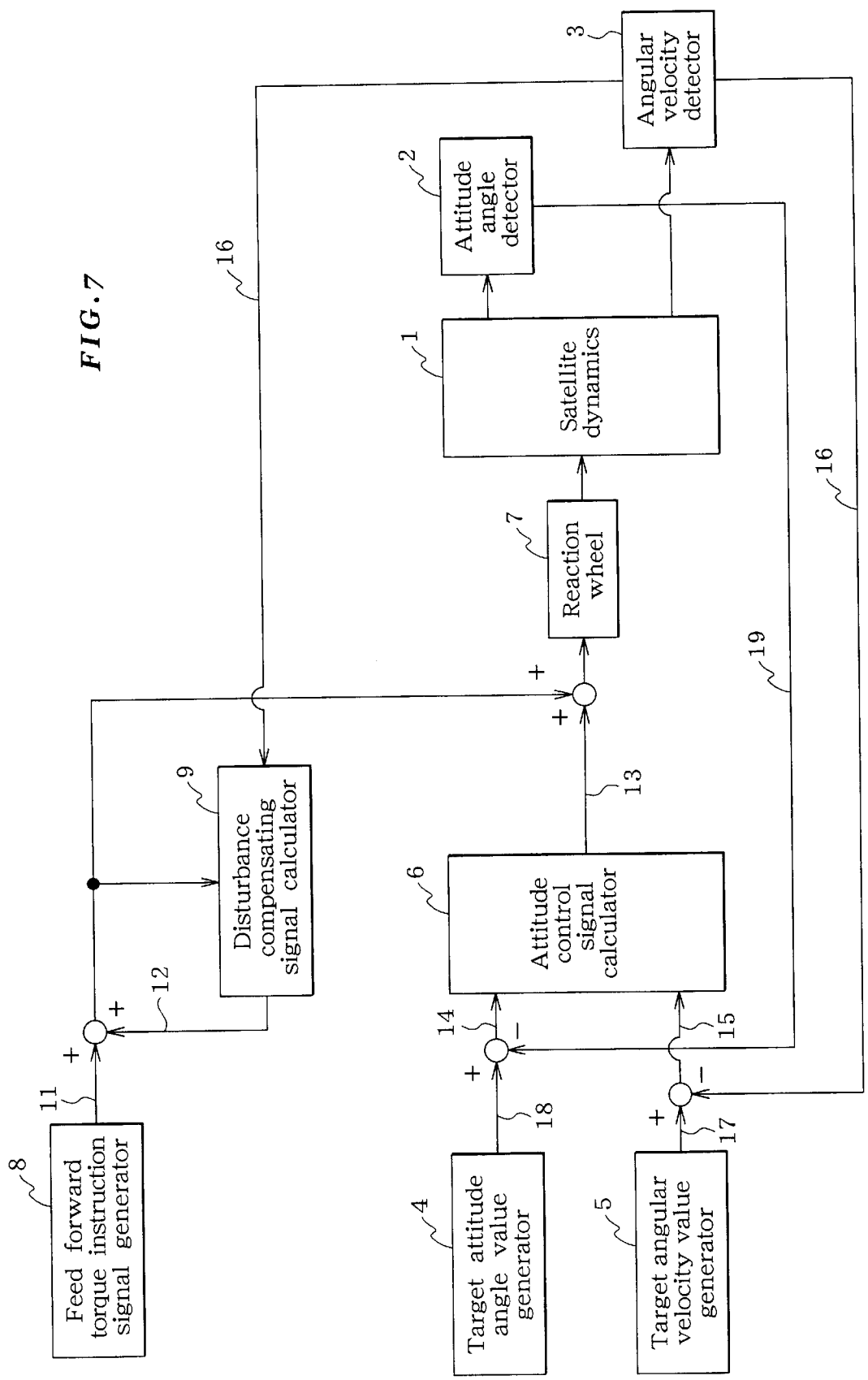
FIG. 7 is a block diagram showing a configuration of a maneuver device according to a fifth example of the invention.

Hereinafter, an artificial satellite maneuver device according to a fifth example of the present invention will be described. FIG. 7 is a block diagram showing a configuration of the maneuver device of the present invention. Referring to the figure, the maneuver device of the present example does not employ a thruster 10 and only a reaction wheel 7 is provided as an attitude control actuator. Therefore, a sum signal calculator (not shown) outputs a sum signal of a feed forward torque instruction signal 11 and a disturbance compensating signal 12 to the reaction wheel 7. Other than the above-described features, the configuration of the maneuver device of the fifth example is the same as that of the maneuver device of the second example.

Next, operations carried out by the maneuver device of the present example will be described. The disturbance compensating signal calculator 9 outputs a disturbance compensating signal 12. The sum signal calculator generates a sum signal of the disturbance compensating signal 12 and the feed forward torque instruction signal 11 from the feed forward torque instruction signal generator 8. The resulting sum signal is input to the reaction wheel 7 as well as to the disturbance compensating signal calculator 9 at a predetermined timing. Other than the above-described operations, the operations of the maneuver device of the present example are the same as those carried out by the maneuver device of the second example.

In the maneuver device of the present example, the disturbance compensating signal calculator 9 generates a disturbance compensating signal 12 according to the above expression (3). The obtained disturbance compensating signal 12 is combined with a feed forward torque instruction signal 11 that is based on an ideal maneuver profile to drive the reaction wheel 7. Thus, constantly speedy and accurate attitude maneuver can be realized. Even through a thruster 10 is not used, compensation can be performed with the disturbance compensating signal 12. By configuring the path of the disturbance compensating signal 12 as a loop, the maneuver device of the present example can compensate for the sum signal of the feed forward torque instruction signal 11 and the disturbance compensating signal 12 generated in a preceding sampling period instead of the original feed forward torque instruction signal 11. Accordingly, more accurate compensation can be realized.

Figure 8:
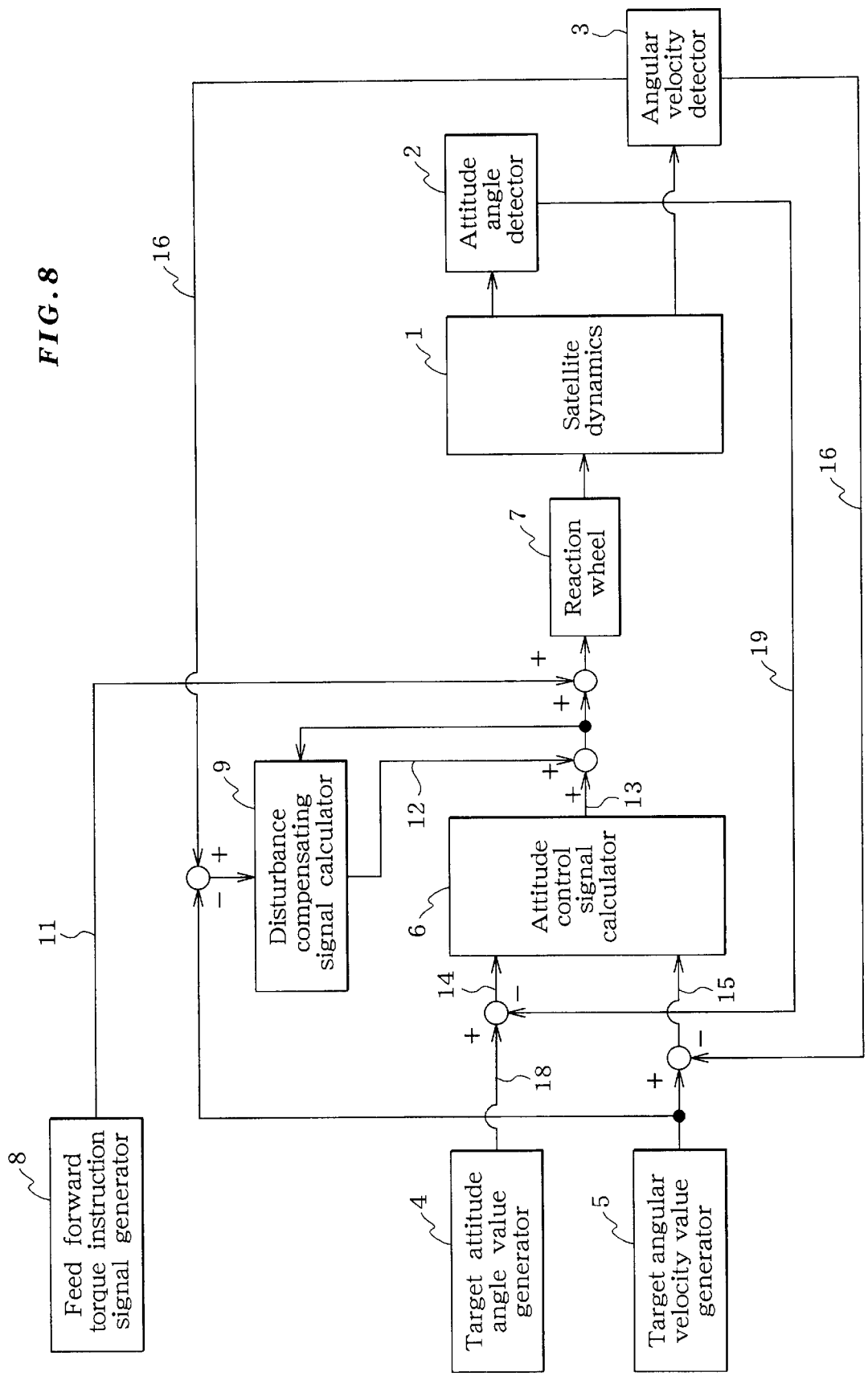
FIG. 8 is a block diagram showing a configuration of a maneuver device according to a sixth example of the invention.
Figure 9:
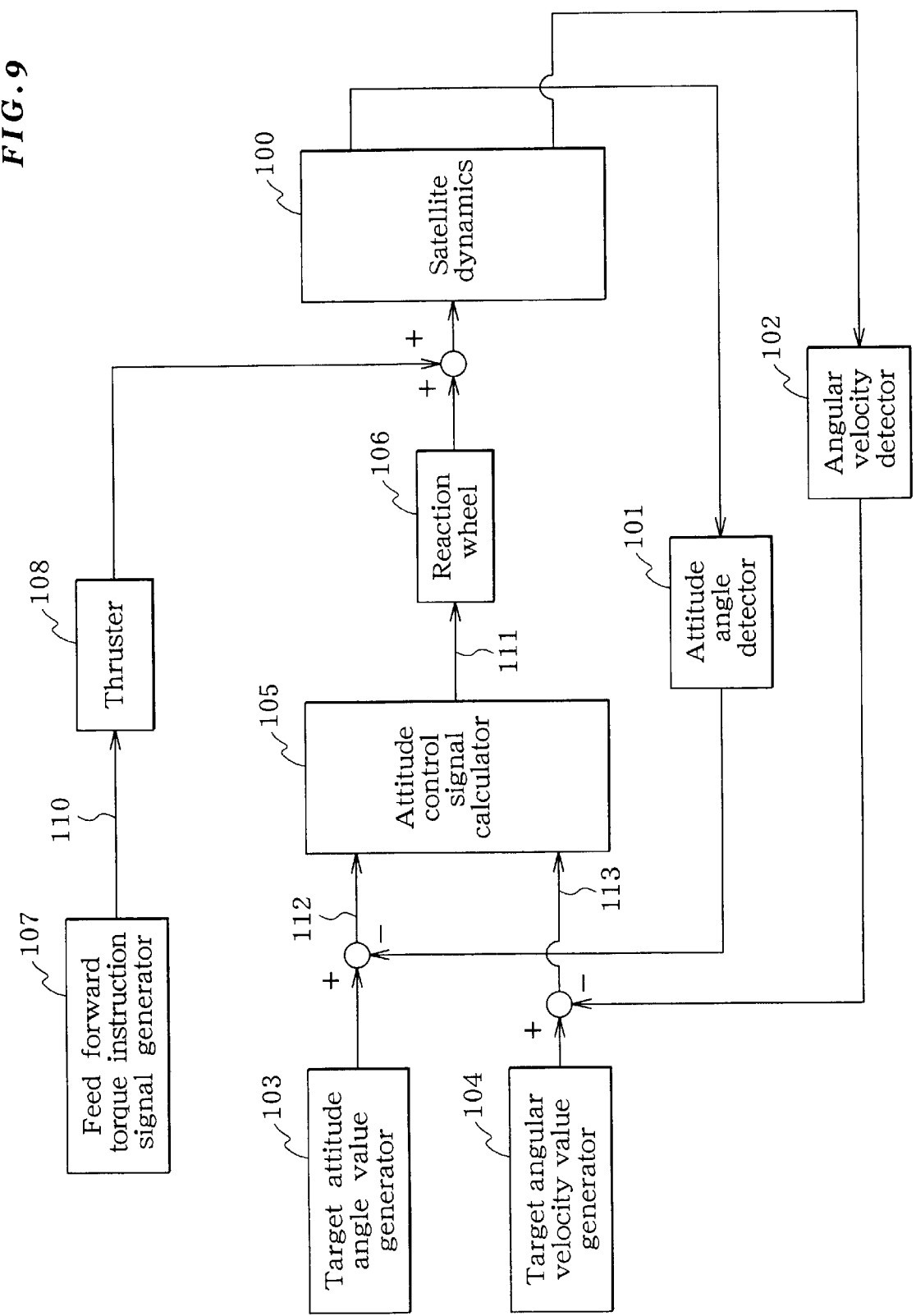
FIG. 9 is a block diagram showing a configuration of an exemplary conventional maneuver device.
Figure 10:
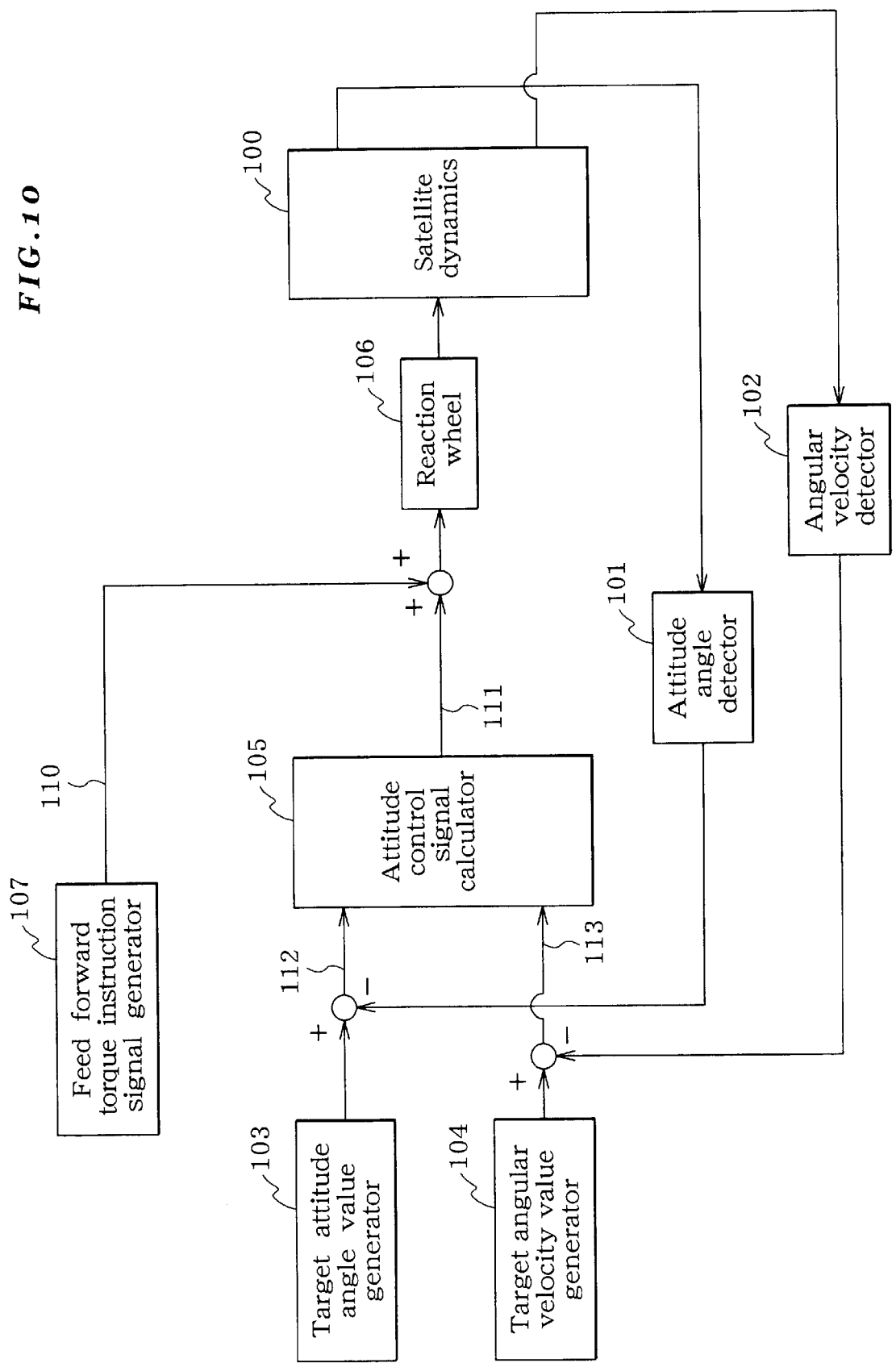
FIG. 10 is a block diagram showing a configuration of another exemplary conventional maneuver device.

Hereinafter, an artificial satellite maneuver device according to a sixth example of the invention will be described. FIG. 8 is a block diagram showing a configuration of the maneuver device according to the present example. Referring to the figure, the maneuver device of the present example does not incorporate a thruster 10 and only a reaction wheel 7 is provided as an attitude control actuator. Accordingly, a feed forward torque instruction signal 11 output from a feed forward torque instruction signal generator 8 is input to the reaction wheel 7. Other than the above-described feature, the configuration of the maneuver device of the present example is the same as that of the maneuver device of the third example.

Next, operations carried out by the maneuver device of the present example will be described. The feed forward torque instruction signal generator 8 generates and outputs a feed forward torque instruction signal 11 to the reaction wheel 7. The reaction wheel 7 is input with a sum signal output from the sum signal calculator (not shown) and the feed forward torque instruction signal 11. Other than these operations, the operations of the maneuver device of the present example are the same as those of the maneuver device of the third example.

In the maneuver device of the present example, similar to the third example of the invention, a disturbance torque d applied to the satellite dynamics 1 is estimated based on a sum signal of an attitude control signal 13 and a disturbance compensating signal 12 as well as a difference signal between a detected angular velocity signal 16 and a target angular velocity signal 17. Accordingly, the effect of the attitude control signal 13 can be reflected on the disturbance compensating signal 12. Thus, characteristics of obeying the pre-planned maneuver profile can be enhanced. In addition, even when a thruster 10 is not incorporated, the reaction wheel 7 can perform compensation with the disturbance compensating signal 12.

As described above, according to the present invention, a disturbance compensating signal calculator is provided in a maneuver device that performs attitude maneuver with a combination of a reaction wheel and a thruster or only with a reaction wheel. As a result, an artificial satellite maneuver device is provided which causes small attitude error during maneuver and which requires a shorter period of setting time for obtaining a target attitude. Thus, a speedy and accurate maneuver can be realized.

What is to be claimed:

1. A maneuver device for an artificial satellite comprising:
   a feed forward torque instruction signal generator for outputting feed forward torque instruction signals as a profile of torque to be applied to the artificial satellite according to a maneuver plan;
   a thruster for generating control torque for driving the artificial satellite based on the feed forward torque instruction signal;
   an angular velocity detector for detecting and outputting an angular velocity of the artificial satellite as a detected angular velocity signal;
   a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel to which the disturbance compensating signal is input, and which, in turn, generates control torque for driving the artificial satellite based on the input disturbance compensating signal.

2. A maneuver device for an artificial satellite comprising:

a feed forward torque instruction signal generator for outputting feed forward torque instruction signals as a profile of torque to be applied to the artificial satellite according to a maneuver plan;

a thruster for generating control torque for driving the artificial satellite based on the feed forward torque instruction signal;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel to which the attitude control signal and the disturbance compensating signal are input, and which, in turn, generates control torque for driving the artificial satellite based on the input signals.

3. A maneuver device for an artificial satellite comprising:

a feed forward torque instruction signal generator for outputting feed forward torque instruction signals as a profile of torque to be applied to the artificial satellite according to a maneuver plan;

a disturbance compensating signal calculator for outputting a disturbance compensating signal for compensating for disturbance torque applied to the artificial satellite during maneuver;

a sum signal calculator to which the feed forward torque instruction signal and the disturbance compensating signal are input, and which, in turn, outputs a sum signal of these input signals at a predetermined timing;

a thruster for generating control torque for driving the artificial satellite based on the sum signal; and an angular velocity detector for detecting and outputting an angular velocity of the artificial satellite as a detected angular velocity signal, wherein the sum signal and the detected angular velocity signal are input to the disturbance compensating signal calculator, which, in turn, generates and outputs a new disturbance compensating signal at a predetermined timing.

4. A maneuver device for an artificial satellite comprising:

a feed forward torque instruction signal generator for outputting feed forward torque instruction signals as a profile of torque to be applied to the artificial satellite according to a maneuver plan;

a disturbance compensating signal calculator for outputting a disturbance compensating signal for compensating for disturbance torque applied to the artificial satellite;

a sum signal calculator to which the feed forward torque instruction signal and the disturbance compensating signal are input, and which, in turn, outputs a sum signal of these input signals at a predetermined timing;

a thruster for generating control torque for driving the artificial satellite based on the sum signal;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; and a reaction wheel for generating control torque for driving the artificial satellite based on the attitude control signal, wherein the sum signal and the detected angular velocity signal are input to the disturbance compensating signal calculator, which, in turn, generates and outputs a new disturbance compensating signal at a predetermined timing.

5. A maneuver device for an artificial satellite comprising:

a feed forward torque instruction signal generator for outputting feed forward torque instruction signals as a profile of torque to be applied to the artificial satellite according to a maneuver plan;

a thruster for generating control torque for driving the artificial satellite based on the feed forward torque instruction signal;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator for outputting a disturbance compensating signal for compensating for disturbance torque applied to the artificial satellite during maneuver;

a sum signal calculator to which the attitude control signal and the disturbance compensating signal are input, and which, in turn, outputs a sum signal of these input signals at a predetermined timing; and a reaction wheel for generating control torque for driving the artificial satellite based on the input sum signal, wherein the difference signal between the detected angular velocity signal and the target angular velocity signal as well as the sum signal are input to the disturbance compensating signal calculator, which, in turn, generates and outputs a new disturbance compensating signal at a predetermined timing.

6. A maneuver device for an artificial satellite comprising:

a feed forward torque instruction signal generator for outputting feed forward torque instruction signals as a profile of torque to be applied to the artificial satellite according to a maneuver plan;

an angular velocity detector for detecting and outputting an angular velocity of the artificial satellite as a detected angular velocity signal;

a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel for generating control torque for driving the artificial satellite based on the disturbance compensating signal and the feed forward torque instruction signal.

7. A maneuver device for an artificial satellite comprising:

a feed forward torque instruction signal generator for outputting feed forward torque instruction signals as a profile of torque to be applied to the artificial satellite according to a maneuver plan;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel for generating control torque for driving the artificial satellite based on the attitude control signal, the disturbance compensating signal and the feed forward torque instruction signal.

8. A maneuver device for an artificial satellite, comprising:

a feed forward torque instruction signal generator for outputting feed forward torque instruction signals as a profile of torque to be applied to the artificial satellite according to a maneuver plan;

a thruster for generating control torque for driving the artificial satellite based on the feed forward torque instruction signal;

an angular velocity detector for detecting and outputting an angular velocity of the artificial satellite as a detected angular velocity signal;

a disturbance compensating signal calculator to which the feed forward torque instruction signal and the detected angular velocity signal are input, and which, in turn, outputs a disturbance compensating signal for compensating for disturbance torque applied to the artificial satellite during maneuver;

wherein the disturbance compensating signal calculator generates the disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator; and a reaction wheel to which the disturbance compensating signal is input, and which, in turn, generates control torque for driving the artificial satellite based on the input disturbance compensating signal.

9. A maneuver device for an artificial satellite comprising:

a feed forward torque instruction signal generator for outputting feed forward torque instruction signals as a profile of torque to be applied to the artificial satellite according to a maneuver plan;

a disturbance compensating signal calculator for outputting a disturbance compensating signal for compensating for disturbance torque applied to the artificial satellite during maneuver;

an angular velocity detector for detecting and outputting an angular velocity of the artificial satellite as a detected angular velocity signal;

a sum signal calculator to which the feed forward torque instruction signal and the disturbance compensating signal are input, and which, in turn, outputs a sum signal of these input signals at a predetermined timing; and a reaction wheel for generating control torque for driving the artificial satellite based on the sum signal, wherein the sum signal and the detected angular velocity signal are input to the disturbance compensating signal calculator, which, in turn, generates and outputs a new disturbance compensating signal at a predetermined timing.

10. A maneuver device for an artificial satellite comprising:

a feed forward torque instruction signal generator for outputting feed forward torque instruction signals as a profile of torque to be applied to the artificial satellite according to a maneuver plan;

a disturbance compensating signal calculator for outputting a disturbance compensating signal for compensating for disturbance torque applied to the artificial satellite during maneuver;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a sum signal calculator to which the feed forward torque instruction signal and the disturbance compensating signal are input, and which, in turn, outputs a sum signal of these input signals at a predetermined timing; and a reaction wheel for generating control torque for driving the artificial satellite based on the sum signal and the attitude control signal, wherein the sum signal and the detected angular velocity signal are input to the disturbance compensating signal calculator, which, in turn, generates and outputs a new disturbance compensating signal at a predetermined timing.

11. A maneuver device for an artificial satellite, comprising:

a feed forward torque instruction signal generator for outputting feed forward torque instruction signals as a profile of torque to be applied to the artificial satellite according to a maneuver plan;

a disturbance compensating signal calculator for outputting a disturbance compensating signal for compensating for disturbance torque applied to the artificial satellite during maneuver;

a sum signal calculator to which the feed forward torque instruction signal and the disturbance compensating signal are input, and which, in turn, outputs a sum signal of these input signals at a predetermined timing;

a thruster for generating control torque for driving the artificial satellite based on the sum signal; and an angular velocity detector for detecting and outputting an angular velocity of the artificial satellite as a detected angular velocity signal, wherein the sum signal and the detected angular velocity signal are input to the disturbance compensating signal calculator, which, in turn, generates and outputs a new disturbance compensating signal at a predetermined timing;

wherein the disturbance compensating signal calculator generates a new disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator.

12. A maneuver device for an artificial satellite comprising:

a feed forward torque instruction signal generator for outputting feed forward torque instruction signals as a profile of torque to be applied to the artificial satellite according to a maneuver plan;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator for outputting a disturbance compensating signal for compensating for disturbance torque applied to the artificial satellite during maneuver;

a sum signal calculator to which the attitude control signal and the disturbance compensating signal are input, and which outputs a sum signal of these input signals at a predetermined timing; and a reaction wheel for generating control torque for driving the artificial satellite based on the sum signal and the feed forward torque instruction signal, wherein the sum signal and the difference signal between the detected angular velocity signal and the target angular velocity signal are input to the disturbance compensating signal calculator, which, in turn, generates and outputs a new disturbance compensating signal at a predetermined timing.

13. A maneuver device for an artificial satellite, comprising:

a feed forward torque instruction signal generator for outputting feed forward instruction signals as a profile of torque to be applied to the artificial satellite according to a maneuver plan;

a thruster for generating control torque for driving the artificial satellite based on the feed forward torque instruction signal;

a target attitude angle value generator for generating and outputting target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator for outputting a disturbance compensating signal for compensating for disturbance torque applied to the artificial satellite during maneuver;

a sum signal calculator to which the attitude control signal and the disturbance compensating signal are input, and which, in turn, outputs a sum signal of these input signals at a predetermined timing; and a reaction wheel for generating control torque for driving the artificial satellite based on the input sum signal, wherein the difference signal between the detected angular velocity signal and the target angular velocity signal as well as the sum signal are input to the disturbance compensating signal calculator, which, in turn, generates and outputs a new disturbance compensating signal at a predetermined timing;

wherein the disturbance compensating signal calculator generates a new disturbance compensating signal according to the following expression:

$$u_d = \frac{\alpha \beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator.

14. A maneuver device for an artificial satellite, comprising:

a feed forward torque instruction signal generator for outputting feed forward torque instruction signals as a profile of torque to be applied to the artificial satellite according to a maneuver plan;

a thruster for generating control torque for driving the artificial satellite based on the feed forward torque instruction signal;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel to which the attitude control signal and the disturbance compensating signal are input, and which, in turn, generates control torque for driving the artificial satellite based on the input signals;

wherein the disturbance compensating signal calculator generates the disturbance compensating signal according to the following expression:

$$u_d = \frac{\alpha \beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator.

15. A maneuver device for an artificial satellite, comprising:

a feed forward torque instruction signal generator for outputting feed forward torque instruction signals as a profile of torque to be applied to the artificial satellite according to a maneuver plan;

an angular velocity detector for detecting and outputting an angular velocity of the artificial satellite as a detected angular velocity signal;

a disturbance compensating signal calculator to which the feed forward torque instruction signal and the detected angular velocity signal are input, and which, in turn, outputs a disturbance compensating signal for compensating for disturbance torque applied to the artificial satellite during maneuver; and a reaction wheel for generating control torque for driving the artificial satellite based on the disturbance compensating signal and the feed forward torque instruction signal;

wherein the disturbance compensating signal calculator generates the disturbance compensating signal according to the following expression:

$$u_d = \frac{\alpha \beta}{(s+\alpha)(s+\beta)} \times (u - Js\omega)$$

where $u_d$ is the disturbance compensating signal, u is the feed forward torque instruction signal, J is a moment of inertia of the artificial satellite, ω is the detected angular velocity signal, α and β are constants indicating a frequency range of the disturbance to be compensated and s is the Laplace operator.

16. A maneuver device for an artificial satellite, comprising:
a feed forward torque instruction signal generator for outputting feed forward torque instruction signals as a profile of torque to be applied to the artificial satellite according to a maneuver plan;
a target attitude angle value generator for generating and outputting a target value of an attitude angle of the artificial satellite as a target attitude angle signal;
a target angular velocity value generator for generating and outputting a target value of an angular velocity of the artificial satellite as a target angular velocity signal;
an attitude angle detector for detecting and outputting an attitude angle of the artificial satellite as a detected attitude angle signal;
an angular velocity detector for detecting and outputting an angular velocity of the artificial satellite as a detected angular velocity signal;
an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;
a disturbance compensating signal calculator to which the feed forward torque instruction signal and the detected angular velocity signal are input, and which, in turn, outputs a disturbance compensating signal for compensating for disturbance torque applied to the artificial satellite during maneuver; and
a reaction wheel for generating control torque for driving the artificial satellite based on the attitude control signal, the disturbance compensating signal and the feed forward torque instruction signal;
wherein the disturbance compensating signal calculator generates the disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, ω is the detected angular velocity signal, α and β are constants indicating a frequency range of the disturbance to be compensated and s is the Laplace operator.

17. A maneuver device for an artificial satellite, comprising
a feed forward torque instruction signal generator for outputting feed forward torque instruction signals as a profile of torque to be applied to the artificial satellite according to a maneuver plan;
a disturbance compensating signal calculator for outputting a disturbance compensating signal for compensating for disturbance torque applied to the artificial satellite;
a sum signal calculator to which the feed forward torque instruction signal and the disturbance compensating signal are input, and which, in turn, outputs a sum signal of these input signals at a predetermined timing;
a thruster for generating control torque for driving the artificial satellite based on the sum signal;
a target attitude angle value generator for generating and outputting a target value of an attitude angle of the artificial satellite as a target attitude angle signal;
a target angular velocity value generator for generating and outputting a target value of an angular velocity of the artificial satellite as a target angular velocity signal;
an attitude angle detector for detecting and outputting an attitude angle of the artificial satellite as a detected attitude angle signal;
an angular velocity detector for detecting and outputting an angular velocity of the artificial satellite as a detected angular velocity signal;
an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal; and
a reaction wheel for generating control torque for driving the artificial satellite based on the attitude control signal,
wherein the sum signal and the detected angular velocity signal are input to the disturbance compensating signal calculator, which, in turn, generates and outputs a new disturbance compensating signal at a predetermined timing:
wherein the disturbance compensating signal calculator generates a new disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, ω is the detected angular velocity signal, α and β are constants indicating a frequency range of the disturbance to be compensated and s is the Laplace operator.

18. A maneuver device for an artificial satellite, comprising:
a feed forward torque instruction signal generator for outputting feed forward torque instruction signals as a profile of torque to be applied to the artificial satellite according to a maneuver plan;
a disturbance compensating signal calculator for outputting a disturbance compensating signal for compensating for disturbance torque applied to the artificial satellite during maneuver;
an angular velocity detector for detecting and outputting an angular velocity of the artificial satellite as a detected angular velocity signal;
a sum signal calculator to which the feed forward torque instruction signal and the disturbance compensating signal are input, and which, in turn, outputs a sum signal of these input signals at a predetermined timing; and a reaction wheel for generating control torque for driving the artificial satellite based on the sum signal, wherein the sum signal and the detected angular velocity signal are input to the disturbance compensating signal calculator, which, in turn, generates and outputs a new disturbance compensating signal at a predetermined timing;

wherein the disturbance compensating signal calculator generates a new disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator.

19. A maneuver device for an artificial satellite, comprising:

a feed forward torque instruction signal generator for outputting feed forward torque instruction signals as a profile of torque to be applied to the artificial satellite according to a maneuver plan;

a disturbance compensating signal calculator for outputting a disturbance compensating signal for compensating for disturbance torque applied to the artificial satellite during maneuver;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a sum signal calculator to which the feed forward torque instruction signal and the disturbance compensating signal are input, and which, in turn, outputs a sum signal of these input signals at a predetermined timing; and a reaction wheel for generating control torque for driving the artificial satellite based on the sum signal and the attitude control signal, wherein the sum signal and the detected angular velocity signal are input to the disturbance compensating signal calculator, which, in turn, generates and outputs a new disturbance compensating signal at a predetermined timing;

wherein the disturbance compensating signal calculator generates a new disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator.

20. A maneuver device for an artificial satellite, comprising:

a feed forward torque instruction signal generator for outputting feed forward torque instruction signals as a profile of torque to be applied to the artificial satellite according to a maneuver plan;

a target attitude angle value generator for generating and outputting a target value of an attitude angle of the artificial satellite as a target attitude angle signal;

a target angular velocity value generator for generating and outputting a target value of an angular velocity of the artificial satellite as a target angular velocity signal;

an attitude angle detector for detecting and outputting an attitude angle of the artificial satellite as a detected attitude angle signal;

an angular velocity detector for detecting and outputting an angular velocity of the artificial satellite as a detected angular velocity signal;

an attitude control signal calculator to which an attitude angle error signal as a difference signal between the target attitude angle signal and the detected attitude angle signal as well as an angular velocity error signal as a difference signal between the target angular velocity signal and the detected angular velocity signal are input, and which, in turn, outputs an attitude control signal;

a disturbance compensating signal calculator for outputting a disturbance compensating signal for compensating for disturbance torque applied to the artificial satellite during maneuver;

a sum signal calculator to which the attitude control signal and the disturbance compensating signal are input, and which outputs a sum signal of these input signals at a predetermined timing; and a reaction wheel for generating control torque for driving the artificial satellite based on the sum signal and the feed forward torque instruction signal, wherein the sum signal and the difference signal between the detected angular velocity signal and the target angular velocity signal are input to the disturbance compensating signal calculator, which, in turn, generates and outputs a new disturbance compensating signal at a predetermined timing;

wherein the disturbance compensating signal calculator generates a new disturbance compensating signal according to the following expression:

$$u_d = \frac{\alpha\beta}{(s+\alpha)(s+\beta)} \times (u - Js\omega)$$

where $u_d$ is the disturbance compensating signal, u is the feed forward torque instruction signal, J is a moment of inertia of the artificial satellite, $\omega$ is the detected angular velocity signal, $\alpha$ and $\beta$ are constants indicating a frequency range of the disturbance to be compensated and s is the Laplace operator.

* * * * *